INVENTOR.
THEODORUS J. VAN KESSEL
JOANNES M. A. UIJEN
BY
Frank R. Trifari
AGENT

INVENTOR.
THEODORUS J. VAN KESSEL
JOANNES M. A. UIJEN
BY
[signature]
AGENT

United States Patent Office 3,378,772

Patented Apr. 16, 1968

3,378,772

APPARATUS FOR CORRECTING THE TRANSMITTED SIGNAL ENVELOPE OF A COMPATIBLE SINGLE SIDEBAND TRANSMITTER

Theodorus Jozef van Kessel and Joannes Maria Albertus Uijen, Emmasingel, Eindhoven, Netherlands, assignors to North American Philips Company, Inc., New York, N.Y., a corporation of Delaware Original application Apr. 9, 1962, Ser. No. 186,255, now Patent No. 3,274,492, dated Sept. 20, 1966. Divided and this application July 21, 1966, Ser. No. 566,863

Claims priority, application Netherlands, May 16, 1961, 264,824

5 Claims. (Cl. 325—137)

This application is a division of application Ser. No. 186,255, filed Apr. 9, 1962, and now Patent Number 3,274,492, granted Sept. 20, 1966.

This invention relates to transmitters for the transmission of amplitude-modulated oscillations, wherein the information content is concentrated substantially on a single side-band. In transmitters of this type, carrier oscillations and the signals to be transmitted are applied to an amplitude modulator. The carrier oscillation and one side-band are derived from the modulator, by means of an output filter, for further transmission.

Transmitters of the above kind afford important advantages from a viewpoint of transmission technique, since in the first place the amplitude of the emitted information signals may be considerably increased with respect to the amplitude of the carrier wave unvaried power of the transmitter. More particularly with normal amplitude modulation the amplitude of each side-band is half the amplitude of the carrier wave with maximum modulation. When only one side-band is transmitted the amplitude of the side-band signal may be equalized to the amplitude of the carrier wave. In addition, a saving in bandwidth is obtained so that the frequency space between transmitters having adjacent frequency bands may be reduced and interaction of such transmitters may be greatly reduced.

An object of the invention is to provide a transmitting device of the above described type in which the reception of signals emitted by the transmitting device in an ordinary amplitude-modulation receiver results in an excellent quality of reproduction while retaining the aforementioned advantages.

According to the invention the first-mentioned amplitude modulator is followed by a second amplitude modulator in which the signal derived from the first-mentioned amplitude modulator as a carrier oscillation is amplitude-modulated by the same signal as a modulating signal. The transmitter also comprises an output filter which passes only the signals located in the signal band at twice the carrier frequency.

In order that the invention may be readily carried into effect, it will now be described in detail, by way of example, with reference to the accompanying diagrammatic drawings, in which:

FIGURE 1 is a block diagram of a transmitter according to the invention;

FIGURES 2*a*–2*h* show several diagrams to explain the operation of the transmitter of FIGURE 1;

Figures 4, 5A, 5B, 6, 7:
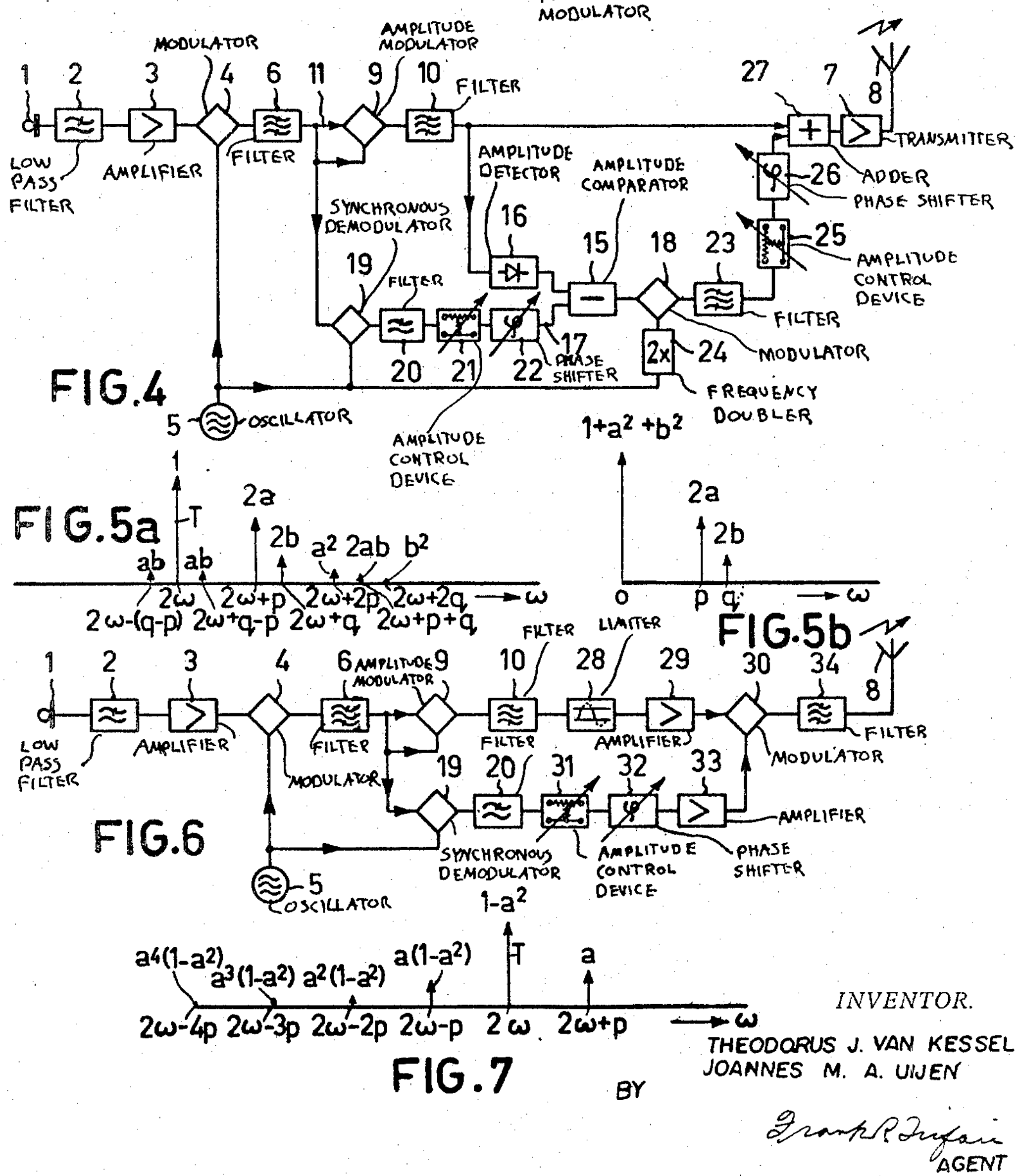
FIGURE 4 shows another embodiment of a transmitter according to the invention in which the reproduction quality upon reception in an ordinary amplitude-modulation receiver is improved.

FIGURES 5*a* and 5*b* show several frequency diagrams to explain the operation of the transmitter of FIGURE 4;

FIGURE 6 shows a preferred embodiment of a transmitter according to the invention with improved quality of reproduction, and FIGURE 7 shows a frequency diagram to explain the operation of the transmitter of FIGURE 6.

Figure 1:
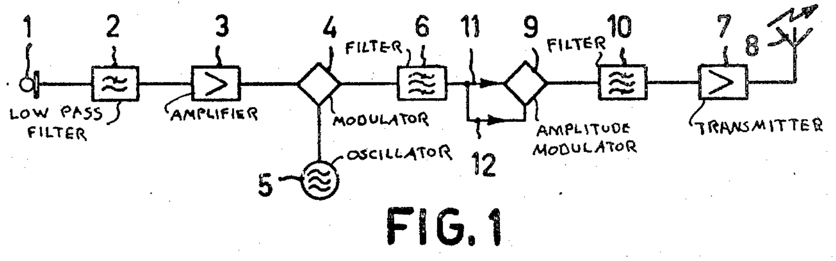

The transmitter shown in FIGURE 1 is adapted for the transmission of speech signals in the band from 300 c./s. to 3,400 c./s. Signals originating from a microphone 1 are applied by way of a low-pass filter 2 and a low-frequency amplifier 3 to a modulator stage 4 including a carrier-wave oscillator 5 of, for example, 400 kc./s. The output of the modulator 4 is applied to an output filter 6 which passes, for example, the upper side-band located in the band from 400.3 kc./s. to 403.4 kc./s. and the carrier oscillation of 400 kc./s. The output signal of filter 6 is applied to a device to be described hereinafter. Then it is amplified and, if desired, transposed in frequency in a transmitting stage 7, and transmitted by means of an antenna 8.

If the transmitting device shown in FIGURE 1 transmits a single sinusoidal speech oscillation of angular frequency $p$, a speech side-band $\omega+p$ occurs at the output of the modulator stage in addition to the emitted carrier oscillation T of angular frequency $\omega$. These oscillations are shown in a frequency diagram in FIGURE 2*a*, in which the amplitude of the carrier oscillation is reduced to unity and the speech side-band has an amplitude $a$ which must be smaller than the amplitude 1 of the carrier-wave in order to prevent overmodulation.

As previously mentioned, the transmitter under consideration has, with respect to ordinary amplitude-modulation transmitters, the advantage that the amplitude of the information signals may be considerably increased with unchanged power of the transmitter and that an increase in efficiency is thus obtained. This is offset by the fact that considerable signal distortion occurs upon reception of the signals emitted by the transmiter in an ordinary amplitude-modulation reeciver, as will be explained more fully with reference to the vector diagram shown in FIG. 2*b*.

In this figure, the vector T again shows the carrier oscillation about which the sinusoidal oscillation $a$ rotates at angular frequency $p$. The sum vector E of these vectors describes the envelope of the emitted oscillations, which, as may appear from the time diagram shown in FIGURE 2*c*, no longer varies sinusoidally so that, upon detection of this envelope in an ordinary amplitude-modulation receiver, distortion products occur in addition to the desired speech frequency $p$.

More particularly, this envelope is represented mathematically by the formula:

$$E=\sqrt{(1+a\cos pt)^2+a^2\sin^2 pt}$$

or developed in a series:

$$E=(1+\tfrac{1}{4}a^2+\tfrac{1}{64}{}^4+\dots)+(a-\tfrac{1}{8}a^3-\tfrac{1}{64}a^5-\dots)\cos pt+(-\tfrac{1}{4}a^2+\tfrac{1}{64}a^4-\dots)\cos 2pt+(\tfrac{1}{8}a^3-\tfrac{5}{128}a^5-\dots)\cos 3pt,\ \text{etc.}$$

Figures 2A, 2B, 2C, 2D, 2E, 2F, 2G, 2H, 2I:
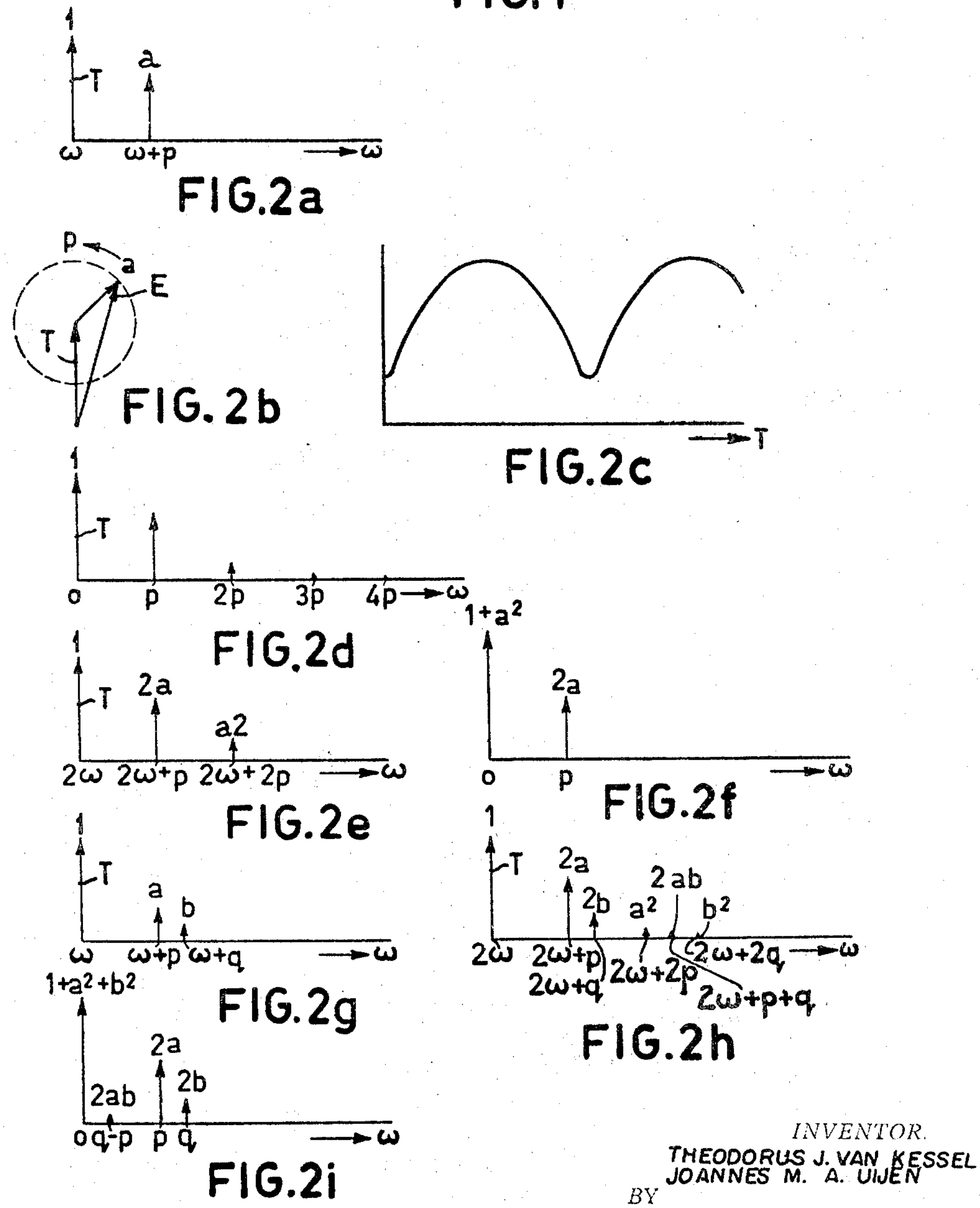

Upon transmission of the frequency spectrum shown in FIGURE 2*a*, there occurs at the output of an ordinary amplitude-modulation receiver, in addition to the desired speech-frequency component $a\cos pt$, the distortion products $\cos 2pt$, $\cos 3pt$ . . . etc., which increase progressively with increasing amplitude $a$ of the speech component. For example, if the speech component has a maximum amplitude $a$ equal to 0.7 times the amplitude of the carrier wave, the total distortion level is 17% relative to the carrier level, corresponding to −15 db.

To illustrate this, FIGURE 2*d* shows the frequency spectrum which occurs at the output of the amplitude-modulation receiver, the values of the various frequency components also being indicated. If the speech signal comprises a plurality of frequency components, for example if the angular frequency component $q$ is present in addition to the frequency component $p$, interference products of frequencies $p+q$, $p-q$, $2p+q$, $2p-q$ . . . etc. occur in addition to the harmonics of each of the components $p$ and $q$. The total distortion level composed of the level of the harmonic distortion components $2p$, $2q$, . . . etc. and the level of the interference products $p+q$, $p-q$ . . . etc. relative to the carrier level is a $-14$ db for a modulation depth of 0.7 and equal levels of the speech components $p$ and $q$.

An object of the invention is to provide a transmitting device in which the reproduction quality upon reception in an ordinary amplitude-modulation receiver is considerably improved while retaining the above-mentioned advantages. According to the invention, this object is attained by providing a second amplitude modulator 9 in which the signal derived from the first-mentioned amplitude modulator 4 as a carrier oscillation is modulated in amplitude by the same signal as a modulating signal. The transmitting device also includes an output filter 10 which passes only the signals located in the signal band at twice the carrier frequency. In the embodiment shown in FIG. 1, the signal derived from amplitude modulator 4 is applied, on the one hand, through conductor 11 as a carrier oscillation and, on the other hand, through conductor 12 as a modulating signal.

For example, in the embodiment shown, as a result of the amplitude modulation, the signals shown in FIGURE 2*a* are transmitted. These signals comprise the carrier wave T of amplitude 1 and frequency $\omega$, together with the speech frequency side-band of amplitude $a$ and frequency $\omega+p$. This signal, given by the formula $$\cos \omega t+a \cos (\omega+p)t$$

is modulated by itself in the amplitude modulator, resulting in a signal $$\tfrac{1}{2}\cos 2\omega t+a \cos (2\omega+p)t+\tfrac{1}{2}a^2 \cos (2\omega+2p)t$$

of twice the carrier frequency. This signal is passed by output filter 10. FIG. 2*e* shows the transmitted signals in a frequency diagram in which the amplitude of the carrier oscillation having a frequency $2\omega$ is again reduced to unity.

By the use of the steps according to the invention, an additional frequency component of amplitude $a^2$ and frequency $2\omega+2p$ is transmitted together with the carrier oscillation of frequency $2\omega$ and amplitude 1 and the speech side-band of amplitude $2a$ and frequency $2\omega+p$ (see FIGURE 2*c*), resulting in signal distortion being reduced to a high degree upon reception of the transmitted oscillations in an ordinary amplitude-modulation receiver. In fact, if the envelope of the transmitted oscillations is calculated in the manner described hereinbefore, the envelope is represented mathematically by the formula:

$$\sqrt{(1+2a \cos pt+a^2 \cos 2pt)^2+(2a \sin pt+a^2 \sin 2pt)^2}$$

which after conversion gives:

$$1+a^2+2a \cos pt$$

that is to say no distortion occurs upon reception in an ordinary amplitude-modulation receiver. FIGURE 2*f* shows the frequency spectrum of the envelope signal for the sake of completeness.

Thus, in order to reduce signal distortion upon reception with an ordinary amplitude-modulation receiver, the transmitter according to the invention transmits, together with the speech side-band of frequency $2\omega+p$ and amplitude $2a$, a correction side-band of frequency $2\omega+2p$ and amplitude $a^2$, the magnitude of which, when starting from a maximum modulation depth to smaller modulation depths, will decrease progressively because of its quadratic character. For example, the amplitude of the correction term is 0.12 for a maximum modulation depth of 0.7, at which $a$ is 0.35, whereas this amplitude is not more than 0.04 for a modulation depth of 0.4. Due to the fact that the amplitude of the components of the frequency spectrum greatly decreases towards the higher signal frequencies with speech signals or with music, the correction terms greatly decrease for these higher signal frequencies and may be suppressed for the higher signal frequencies located outside the signal band without substantially affecting the reproduction quality so that in a transmitter according to the invention the bandwidth of the signal may be maintained without disadvantage for the reproduction quality being involved.

The behavior of the above described transmitter if a plurality of frequency components are simultaneously present in the signal band, for example if in addition to the speech frequency $p$ of amplitude $a$ another speech frequency $q$ of amplitude $b$ is transmitted, will now be considered with reference to the frequency diagrams shown in FIGURES 2*g*, 2*h* and 2*i*. FIGURE 2*g* shows the frequency location of the frequency components $p$ and $q$ in the output circuit of amplitude modulator 4, and FIGURES 2*h* and 2*i* show respectively the associated frequency diagrams of the signals transmitted by the transmitter and of the associated envelope signal, which may be calculated in the manner as explained hereinbefore.

As may appear from FIGURE 2*h*, in addition to the speech side-bands $2\omega+p$ and $2\omega+q$ of amplitudes $2a$ and $2b$, the frequency components $2\omega+2p$, $2\omega+p+q$ and $2\omega+2q$ of amplitudes $a^2$, $2ab$ and $b^2$ are transmitted. In the corresponding frequency diagram of the envelope signal in FIGURE 2*i*, as before, no harmonic distortion products are present, and only a single comparatively small intermodulation product $q-p$ of amplitude $2ab$ occurs. The level of this product as compared with the level of the intermodulation products in a known device, is further considerably improved. For example, when assuming the theoretically most unfavorable case of maximum modulation depth of say 0.7, that is to say that the sum of the speech components $2a$ and $2b$ is 0.7 and of equal amplitudes $2a$ and $2b$ for the speech components $p$ and $q$, then the distortion level characterized by this intermodulation term relative to the carrier level is about 0.06, corresponding to a distortion level of $-25$ db. As a matter of fact, the mean distortion level is considerably lower than this theoretical maximum which can occur only in very special conditions.

When the signals transmitted by a transmitter according to the invention are received in an ordinary amplitude-modulation receiver, only a single intermodulation term remains of all the distortion products, as explained in FIGURE 2*i*. The total distortion level is reduced to at most $-25$ db, which is permissible for small transmitters for speech signals, for example mobilephone apparatus, but which is still too high for broadcast purposes which require a distortion level of at least $-40$ db. FIGURES 4 and 6 show further embodiments of the decive according to the invention in which the quality requirements for broadcast purposes are fulfilled. Before explaining this device more fully, a detailed description of the device shown in FIGURE 3, which is particularly advantageous in practice, will first be given.

Figure 3:
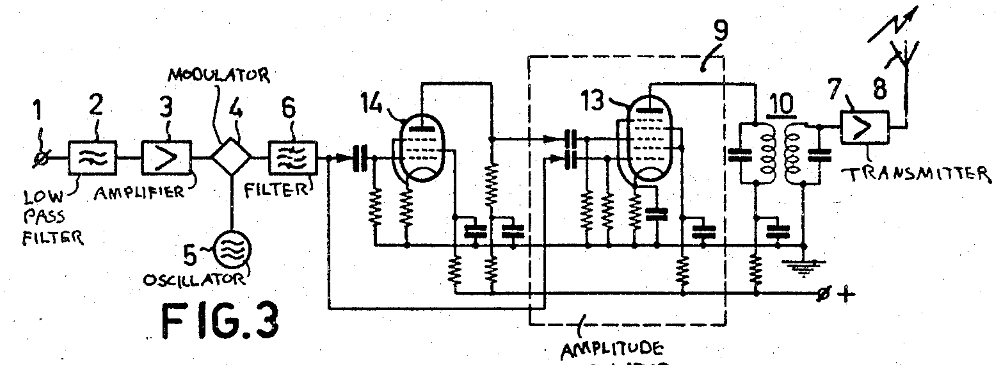
FIGURE 3 shows the transmitter of FIGURE 1 in greater detail.

FIGURE 3 shows modulator stage 9 in greater detail, the other elements being identical with those in FIGURE 1 being indicated by the same reference numerals.

In the device shown in FIGURE 3 the modulator stage 9 is formed by a multigrid tube in the form of a heptode 13 in which the output signal from modulator stage 4 is applied to the first and also to the third grid. The signals applied to the first and third grids are modulated in the multigrid tube, the signals located in the signal band being selected at twice the carrier frequency for further use in the transmitting apparatus by means of a bandpass filter 10 included in the anode circuit of heptode 13.

The described modulating stage has, for the specified purpose, the important advantage that modulation may be effected without amplification of energy, and unwanted modulation products may be greatly reduced by applying the signals to the third grid in phase opposition to the signals applied to the first grid, which may be achieved in the device shown by using a pentode 14 connected as an amplifier.

FIGURE 4 shows a block diagram of a transmitter according to the invention in which the quality requirements for broadcast purposes are fulfilled, that is to say the distortion level is more than 46 db below the desired signal upon reception in an ordinary amplitude-modulation receiver. As in the device decribed with reference to FIGURE 3, elements identical with those of FIGURE 1 are indicated by the same reference numerals.

In the described device in which as previously explained in detail with reference to FIGURES 1 and 2, a frequency spectrum of the emitted signals, together with an associated envelope signal are obtained, which form already a first approximation for realizing the quality requirements for broadcast purposes, the steps for completely satisfying the said quality requirements have the character of a correction on the emitted frequency spectrum and the associated envelope signal. Due to these steps for realizing the quality requirements, the resulting advantages, namely the increase in amplitude of the transmitted information signals and the decreased interaction of frequency-adjacent transmitters, are fully retained.

In the device shown in FIGURE 4, for this purpose the distortion products occurring in an ordinary amplitude detector upon detection of the output signals from amplitude-comparison device 15 which is controlled, on one hand, by the output voltage of an amplitude detector 16 connected to the output circuit of amplitude modulator 9 and, on the other hand, through conductor 17 by the low-frequency signals to be transmitted. The distortion products, after being modulated in a push-pull modulator 18, are subseqneutly transmitted by antenna 8 as a compensation term in the correct phase and amplitude, together with the signals from amplitude modulator 9, on a carrier frequency $2\omega$ corresponding to the transmitted signals. The low-frequency signals to be transmitted are obtained by demodulation of the output signals from amplitude modulator 4 in a synchronous demodulator 19 and an associated low-pass filter 20 to which the carrier oscillation from oscillator 5 is supplied for demodulation, the conductor 17 to the amplitude-comparison device 15 including an adjustable amplitude-control device 21 and an adjustable phase-shifting network 22 which serve for adjustment of the correct amplitude and phase in comparing the amplitudes. If desired, the low-frequency signals to be tranmitted may be derived directly from low-frequency amplifier 3, but deriving the speech signals by demodulation of the output signals from amplitude modulator 4 in synchronous demodulator 19 has been found advantageous in view of the correct phase relation obtained during comparison of the amplitudes.

The output signals from amplitude-comparison device 15 are modulated, with suppression of the carrier wave, in push-pull modulator 18 and an output filter 23 on a carrier frequency $2\omega$ corresponding to the transmitted signals and which is obtained by frequency-doubling of the frequency of carrier-wave oscillator 5 in a frequency doubler 24, the resulting side-bands being combined through an adjustable amplitude-control device 25 and an adjustable phase-shifting network 26 with the output signals from amplitude modulator 9 in an adding device 27 and emitted by antenna 8. With correct adjustment of the amplitude and phase, the two side-bands upon detection in an ordinary amplitude detector provide a correction term which is equal in value, but in phase opposition to the distortion products occurring upon amplitude detection of the output signals from amplitude modulator 9, so that the quality requirements for broadcast purposes are fulfilled, for example the distortion level has been reduced to −46 db.

The frequency diagram of the signals emitted by the transmitter of FIGURE 4, together with that of the associated envelope signal, will now be explained with reference to FIGURE 5.

As previously explained in the foregoing, upon transmission of a single speech frequency $p$, distortion products do not occur at the output of amplitude detector 16 so that the output voltages of amplitude detector 16 and synchronous demodulator 19 balance each other in amplitude-comparison device 15, so that no signal is applied to adding device 27 through push-pull modulator 18. The transmitted frequency spectrum then corresponds to FIGURE 2*e* and that of the associated envelope signal to FIG. 2*f*.

Upon transmission of a plurality of speech frequencies, for example if in addition to speech frequency $p$, a second speech frequency $q$ is transmitted, a distortion product of frequency $q-p$ occurs, as shown in FIGURE 2*i*, in the output circuit of amplitude detector 16 and is modulated via amplitude-comparison device 15 in push-pull modulator 18, with suppression of the carrier wave, on the carrier frequency $2\omega$ so that two side-band frequencies $2\omega-(q-p)$ and $2\omega+(q-p)$ located one on each side of the carrier frequency are supplied to adding device 27.

FIGURE 5*a* shows the frequency spectrum transmitted by the transmitter of FIGURE 4, in which, in addition to the frequency spectrum emitted by amplitude modulator 9 (see FIGURE 2*h*), two further side-band frequencies $2\omega(q-p)$ and $2\omega+(q-p)$ of amplitude $ab$ located one on each side of the carrier oscillations are transmitted. The transmitted frequency spectrum then lies substantially on one side of the carrier oscillation $2\omega$.

FIGURE 5*b* shows the frequency spectrum of the envelope signal in which distortion upon reception in an ordinary amplitude-modulation receiver is substantially compensated due to the cotransmitted side-band frequencies $2\omega-(q-p)$ and $2\omega+(q-p)$. For this purpose it is not essential to transmit both side-bands $2\omega-(q-p)$ and $2\omega+(q-p)$, it being possible to suppress the side-band $2\omega-(q-p)$ by means of a filter, in which event the other side-band $2\omega+(q-p)$ must be increased twice in amplitude, since amplitude detection of this side-band by the carrier wave $2\omega$ again provides the desired compensation term of frequency $(q-p)$ and amplitude $2ab$ for the distortion products occurring upon amplitude detection. In this case the transmitted signal has the character of a pure single side-band.

In the described device the transmission quality suitable for broadcast purposes is obtained by means of a compensating device controlled by the transmitted low-frequency signals, which device either brings the envelope of the signals transmitted by amplitude modulator 9 in its form practically in conformity with the low-frequency signal to be transmitted, or renews the transmitted envelope signal. The advantages with regard to the increased amplitude of the transmitted information signals and decreased influencing of frequency-adjacent transmitters are retained because of the corrective character of the steps carried out.

FIGURE 6 shows a further embodiment of a transmitter according to the invention for obtaining a reproduction quality suitable for broadcast purposes, which affords particular advantages in practice since it permits the use of high-power modulation. As in the device shown in FIGURE 4, for this purpose the envelope signal of the signals transmitted by amplitude modulator 9 is renewed, but in this case the envelope is renewed in a different way, namely by replacing the envelope of the output signal from amplitude modulator by the envelope of the original low-frequency signal.

More particularly in this device the output signal from amplitude modulator 9 is limited to a constant value in an amplitude limiter 28, the limited signal of constant amplitude, after amplification in an amplifier 29, being applied as a carrier oscillation to a high-power modulator 30. The signal obtained by limitation is a phase-modulated signal the frequency spectrum of which may be mathematically calculated in a comparatively simple manner, that is to say modulation of this signal by the associated envelope signal must provide again the frequency spectrum transmitted by amplitude modulator 9.

To illustrate this, FIGURE 7 shows the frequency spectrum of the limited signal on the transmitted carrier frequency $2\omega$ if only one speech component of frequency $p$ and amplitude $a$ is transmitted.

In the device shown in FIGURE 6, the envelope of the signals transmitted by amplitude modulator 9 is replaced by the low-frequency signal to be transmitted, which is derived from synchronous demodulator 19 in the manner previously described with reference to FIGURE 4 and applied through an adjustable amplitude-control device 31 and an adjustable phase-shifting network 32, after amplification in an amplifier 33, as a modulating signal to high-power modulator 30. The signal thus modulated in amplitude in the high-power modulator is transmitted through an output network 34 by antenna 8.

As in the device shown in FIGURE 4, the envelope of the signal transmitted by amplitude modulator 9 is renewed, FIGURE 2*f* showing the frequency spectrum of the envelope signal upon transmission of one speech frequency and FIGURE 5*b* showing the frequency spectrum upon transmission of a plurality of speech components, for example if speech frequency $q$ is transmitted simultaneously with speech frequency $p$. The device of FIGURE 6 permits reception that is theoretically free of distortion in an ordinary amplitude-modulation receiver.

The corresponding frequency spectra of the signals emitted by the transmitter of FIGURE 6 correspond to the frequency spectra shown in FIGURES 2*e* and 5*a*.

In this connection it is to be noted that existing amplitude-modulation transmitters may be rebuilt in a simple manner to form a transmitting device according to the invention by using the steps described with reference to FIGURE 6 whereby with unchanged power of the transmitter the amplitude of the transmitted information signals is increased and the influence of frequency-adjacent transmitters is decreased.

What is claimed is:

1. A transmitter for transmitting single sideband signals comprising a source of information signals, a source of oscillations of predetermined frequency, means for amplitude modulating said oscillations with said information signals to provide first single sideband signals including said oscillations and one modulated sideband thereof, an amplitude modulator, first and second paths for applying said first single sideband signal to said amplitude modulator, said amplitude modulator comprising means for multiplying the signals applied by way of said first and second paths, whereby said amplitude modulator produces a second single sideband signal in a frequency band at twice the frequency of said oscillations, said second single sideband signal including a carrier oscillation at twice the frequency of said oscillations, means for synchronously demodulating a portion of said first single sideband signal, means for detecting a portion of said second single sideband signal, means for comparing the outputs of said demodulating and detecting means to provide a correction signal, means for correcting the envelope of said second single sideband signals with said correction signal, and means for transmitting said envelope corrected second single sideband signal.

2. A transmitter for transmitting single sideband signals comprising a source of information signals, a source of oscillations of predetermined frequency, means for amplitude modulating said oscillations with said information signals to provide first single sideband signals including said oscillations and one modulated sideband thereof, an amplitude modulator, first and second paths connected to said amplitude modulator means, means for applying said first single sideband signal to said first and second signal paths, said amplitude modulator comprising means for multiplying the signals applied thereto by way of said first and second paths, whereby said amplitude modulator produces a second single sideband signal in a frequency band at twice the frequency of said oscillations, said second single sideband signal including a carrier oscillation at twice the frequency of said oscillations, means for synchronously demodulating a portion of said first single sideband signal, means for detecting a portion of said second single sideband signal, means for comparing the outputs of said demodulating and detecting means to provide a correction signal, means for frequency doubling said oscillations, means for modulating said doubled oscillations with said correction signal, means for adding said modulated doubled oscillations and said second single sideband signals, and means for transmitting the output of said adding means.

3. The transmitter of claim 2, comprising amplitude and phase correcting means connected between said synchronous demodulating means and said comparing means.

4. The transmitter of claim 2, comprising amplitude and phase correcting means connected between the output of said means for modulating said doubled oscillations and said adding means.

5. The transmitter of claim 2, in which said means for modulating said doubled oscillations is a push-pull modulator.

References Cited

UNITED STATES PATENTS

| | | | |
|---|---|---|---|
| 2,989,707 | 6/1961 | Kahn | 332—45 |

ROBERT L. GRIFFIN, *Primary Examiner.*

B. V. SAFOUREK, *Assistant Examiner.*